United States Patent
Park et al.

(10) Patent No.: US 10,048,535 B2
(45) Date of Patent: Aug. 14, 2018

(54) DISPLAY DEVICE INCLUDING A POLARIZER UNIT HAVING ELECTRIC CONDUCTIVITY

(71) Applicant: SAMSUNG DISPLAY CO., LTD., Yongin-si, Gyeonggi-do (KR)

(72) Inventors: Seiyong Park, Hwaseong-si (KR); Shoyeon Kim, Hwaseong-si (KR); Wansoon Im, Cheonan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/691,881

(22) Filed: Aug. 31, 2017

(65) Prior Publication Data
US 2018/0074369 A1    Mar. 15, 2018

(30) Foreign Application Priority Data
Sep. 12, 2016    (KR) .................. 10-2016-0117317

(51) Int. Cl.
*G02F 1/1335* (2006.01)
*G02F 1/1343* (2006.01)
*G02F 1/1368* (2006.01)

(52) U.S. Cl.
CPC ...... *G02F 1/133528* (2013.01); *G02F 1/1368* (2013.01); *G02F 1/133512* (2013.01); *G02F 1/133514* (2013.01); *G02F 1/133553* (2013.01); *G02F 1/134309* (2013.01); *G02F 2001/133531* (2013.01); *G02F 2001/133538* (2013.01); *G02F 2001/133548* (2013.01); *G02F 2001/134318* (2013.01); *G02F 2201/34* (2013.01); *G02F 2201/50* (2013.01); *G02F 2203/02* (2013.01); *G02F 2203/05* (2013.01)

(58) Field of Classification Search
CPC .................. G02F 1/13463; G02F 2001/133548
See application file for complete search history.

(56) References Cited

U.S. PATENT DOCUMENTS

| | | | |
|---|---|---|---|
| 8,264,638 B2 | 9/2012 | Jung et al. | |
| 8,294,848 B2 | 10/2012 | Cho et al. | |
| 2013/0120675 A1 | 5/2013 | Oh et al. | |
| 2016/0077265 A1 | 3/2016 | Choi et al. | |
| 2016/0161798 A1 | 6/2016 | Lee et al. | |
| 2017/0017115 A1* | 1/2017 | Kim | G02F 1/13439 |
| 2017/0075471 A1* | 3/2017 | Hong | G06F 3/044 |

FOREIGN PATENT DOCUMENTS

| | | |
|---|---|---|
| KR | 10-2010-0090570 | 8/2010 |
| KR | 10-2010-0111103 | 10/2010 |
| KR | 10-2013-0053997 | 5/2013 |
| KR | 10-2014-0013654 | 2/2014 |
| KR | 10-2016-0069628 | 6/2016 |

* cited by examiner

*Primary Examiner* — Phu Vu
(74) *Attorney, Agent, or Firm* — F. Chau & Associates, LLC

(57) ABSTRACT

A display device includes a display substrate, a liquid crystal layer disposed on the display substrate, a common electrode disposed on the liquid crystal layer, a first protection layer disposed on the common electrode, a polarizer unit disposed on the first protection layer, and a color conversion layer disposed on the polarizer unit. The polarizer unit includes a polarizing portion that polarizes light, and a blocking portion that blocks transmittance of light. The blocking portion is connected to the common electrode through a contact hole. The contact hole is an opening in the first protection layer.

20 Claims, 14 Drawing Sheets

DISPLAY DEVICE INCLUDING A POLARIZER UNIT HAVING ELECTRIC CONDUCTIVITY

CROSS-REFERENCE TO RELATED APPLICATION

This application claims priority under 35 U.S.C. § 119 to Korean Patent Application No. 10-2016-0117317, filed on Sep. 12, 2016, in the Korean Intellectual Property Office (KIPO), the disclosure of which is incorporated by reference herein in its entirety.

TECHNICAL FIELD

The present invention relates to a display device, and more particularly, to a display device including a polarizer unit having electric conductivity.

DISCUSSION OF RELATED ART

A liquid crystal display (LCD) device is a type of a flat panel display (FPD) device, which is widely used. The LCD device includes two substrates including electrodes formed thereon and a liquid crystal layer interposed between the two substrates.

Upon applying voltage to the two electrodes, liquid crystal molecules of the liquid crystal layer are arranged such that an amount of light transmitted through the two substrates is controlled. An LCD device may include a color filter to display colors.

A fluorescent pattern may be used as a color filter. A display device including a fluorescent pattern may be referred to as a photo-luminescent display (PLD) device.

SUMMARY

According to an exemplary embodiment of the present invention, a display device includes a display substrate, a liquid crystal layer disposed on the display substrate, a common electrode disposed on the liquid crystal layer, a first protection layer disposed on the common electrode, a polarizer unit disposed on the first protection layer, and a color conversion layer disposed on the polarizer unit. The polarizer unit includes a polarizing portion that polarizes light, and a blocking portion that blocks transmittance of light. The blocking portion is connected to the common electrode through a contact hole. The contact hole is an opening in the first protection layer.

According to an exemplary embodiment of the present invention, a display device includes a display substrate, a liquid crystal layer disposed on the display substrate, a common electrode disposed on the liquid crystal layer, a first protection layer disposed on the common electrode, a polarizer unit disposed on the first protection layer, and a color filter layer disposed on the polarizer unit. The polarizer unit includes a polarizing portion polarizing light, and a blocking portion blocking light. The blocking portion is connected to the common electrode through a contact hole of the first protection layer.

According to an exemplary embodiment of the present invention, a display device includes a first substrate, a second substrate, a liquid crystal layer disposed between the first and second substrates, a backlight unit disposed on a first surface of the first substrate, a thin film transistor disposed on a second surface of the first substrate, opposite to the first surface of the first substrate, wherein the thin film transistor is connected to a pixel electrode, a common electrode disposed on the second substrate, a protection layer disposed on the second substrate, and a polarizing layer disposed on the second substrate. The protection layer is disposed between the common electrode and the polarizing layer. The thin film transistor includes a source electrode, and wherein the source electrode is an extension of, or connected to a data line. The polarizing layer includes a blocking portion, overlapping the data line, and a light-polarizing portion, overlapping the pixel electrode. The protection layer includes at least one hole. The common electrode and the blocking portion are electrically connected to each other through the at least one hole.

BRIEF DESCRIPTION OF THE DRAWINGS

The above and other features of the present invention will become more apparent by describing in detail exemplary embodiments thereof in conjunction with the accompanying drawings, in which.

DETAILED DESCRIPTION OF THE EMBODIMENTS

Figure 1:
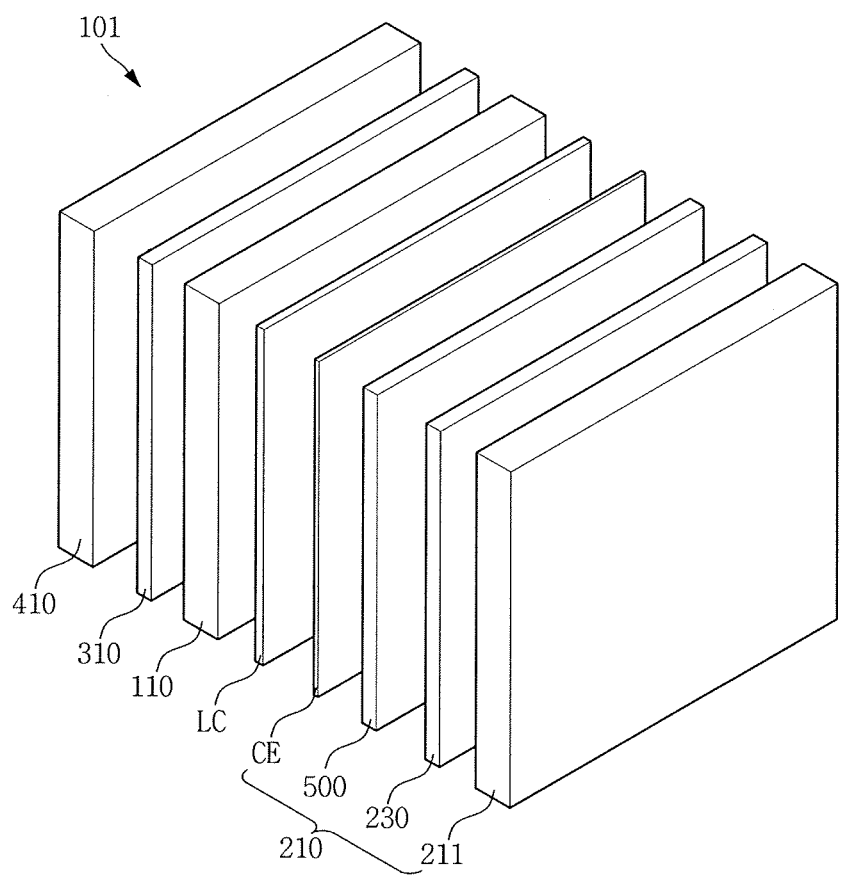
FIG. 1 is an exploded perspective view illustrating a display device according to an exemplary embodiment of the present invention.

Exemplary embodiments of the present invention will be described more fully hereinafter with reference to accompanying drawings. The present invention may, however, be embodied in different forms and should not be construed as limited to the embodiments set forth herein. Like reference numerals may refer to like elements throughout the specification. The sizes or proportions of elements illustrated in the drawings may be exaggerated for clarity.

It will be understood that when an element is referred to as being "on" another element, it may be directly on the other element, or intervening elements may also be present therebetween.

"About" or "approximately" as used herein is inclusive of the stated value and means within an acceptable range of deviation for the particular stated value as determined by one of ordinary skill in the art, considering the measurement in question and the error associated with measurement of the particular quantity. For example, "about" may mean within one or more standard deviations, or within +30%, 20%, 10%, 5%, or less than 5% of the stated value.

Hereinafter, an exemplary embodiment of the present invention will be described with reference to FIGS. 1, 2, and 3.

FIG. 1 is an exploded perspective view illustrating a display device 101 according to an exemplary embodiment of the present invention.

Referring to FIG. 1, the display device 101 may include a backlight unit 410, a first polarizer 310, a display substrate 110, a liquid crystal layer LC, and an opposing substrate 210 that are sequentially disposed on each other. The opposing substrate 210 may include a common electrode CE, a polarizer unit 500, a color conversion layer 230, and a second substrate 211.

The backlight unit 140 may emit ultraviolet ("UV") rays, rear UV rays, or the like. The backlight unit 140 may emit light, for example, white light or blue light to the display substrate 110. Hereinafter, an exemplary embodiment of the present invention will be described by assuming that the backlight unit 140 emits blue light.

Figure 2:
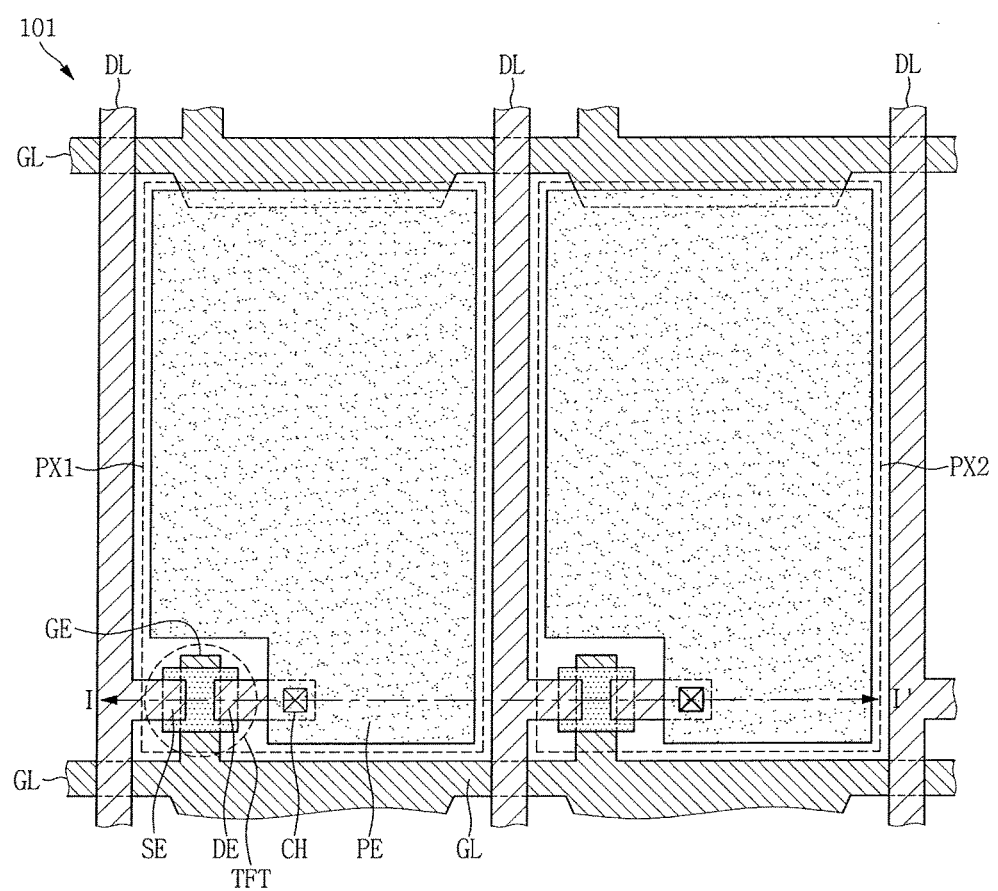
FIG. 2 is a plan view illustrating a pixel of the display device illustrated in FIG. 1, according to an exemplary embodiment of the present invention.

FIG. 2 is a plan view illustrating a pixel of the display device illustrated in FIG. 1, according to an exemplary embodiment of the present invention. FIG. 3 is a cross-sectional view taken along line I-I' of FIG. 2, according to an exemplary embodiment of the present invention.

Figure 3:
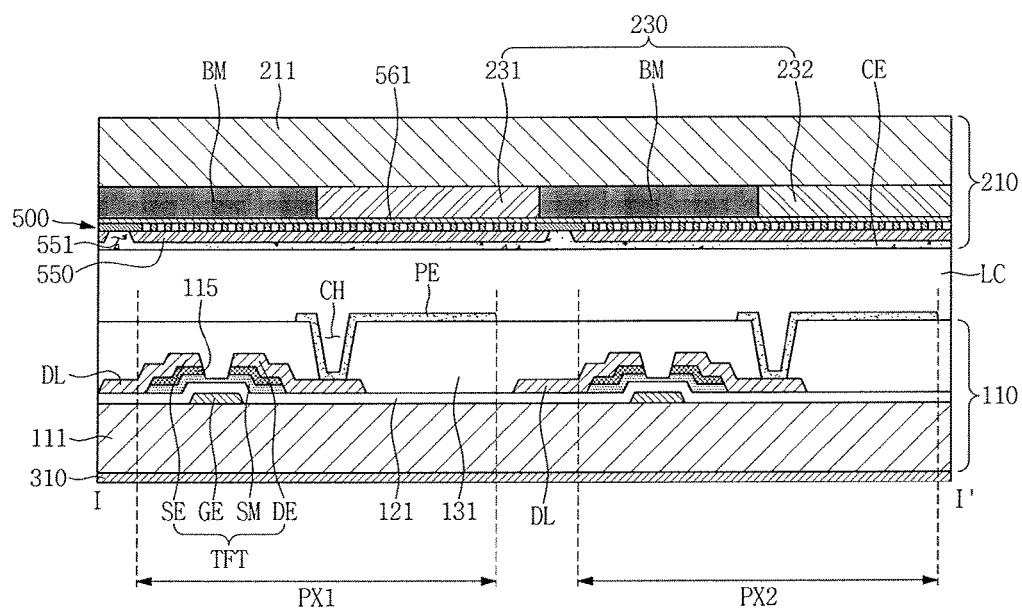
FIG. 3 is a cross-sectional view taken along line I-I' of FIG. 2, according to an exemplary embodiment of the present invention.

Referring to FIGS. 2 and 3, the display device 101 may include a display substrate 110, an opposing substrate 210 opposing the display substrate 110, and a liquid crystal layer LC disposed between the display substrate 110 and the opposing substrate 210.

The liquid crystal layer LC may control a transmittance of a light provided from the backlight unit 410. Thus, in an exemplary embodiment of the present invention, the display device 101 is a liquid crystal display ("LCD") device including a liquid crystal layer LC.

The display substrate 110 may include a first substrate 111, a thin film transistor ("TFT"), a pixel electrode PE, a gate insulating layer 121, and a planarization layer 131. The TFT may include a semiconductor layer SM, an ohmic contact layer 115, a gate electrode GE, a source electrode SE and a drain electrode DE.

The first substrate 111 may include transparent glass or plastic.

A plurality of gate lines GL and a plurality of gate electrodes GE may be disposed on the first substrate 111. A gate electrode GE may be a portion of, or an extension of a corresponding gate line GL. The gate lines GL and the gate electrodes GE may include: aluminum (Al) or alloys thereof, silver (Ag) or alloys thereof, copper (Cu) or alloys thereof, molybdenum (Mo) or alloys thereof, chromium (Cr), tantalum (Ta), and/or titanium (Ti). At least one of the gate line GL or the gate electrode GE may have a multilayer structure including at least two conductive layers that have different physical properties.

The gate insulating layer 121 may be disposed over an entire surface of the first substrate 111, including the gate lines GL and the gate electrodes GE. The gate insulating layer 121 may include silicon nitride ($SiN_x$) or silicon oxide ($SiO_x$). In addition, the gate insulating layer 121 may have a multilayer structure including at least two insulating layers having different physical properties.

The semiconductor layer SM may be disposed on the gate insulating layer 131. The semiconductor layer SM may overlap the gate electrode GE below the gate insulating layer 131. The semiconductor layer SM may include amorphous silicon, polycrystalline silicon, or the like. The semiconductor layer SM may include an oxide semiconductor.

The ohmic contact layer 115 is disposed on the semiconductor layer SM. For example, the ohmic contact layer 115 is disposed on the semiconductor layer SM adjacent to a channel area.

A plurality of data lines DL may be disposed on the gate insulating layer 121. The data lines DL may intersect the gate lines GL. A source electrode SE may be an extension of, or connected to a corresponding data line DL. The source electrode SE may be disposed on the ohmic contact layer 115. The drain electrode DE may be disposed on the ohmic contact layer 115 and may be connected to the pixel electrode PE.

At least one of the data line DL, the source electrode SE, and the drain electrode DE may include a refractory metal such as molybdenum, chromium, tantalum, and/or titanium, and/or an alloy thereof. At least one of the data line DL, the source electrode SE, and the drain electrode DE may have a multilayer structure including a refractory metal layer and/or a low-resistance conductive layer.

The planarization layer 131 may be disposed over an entire surface of the first substrate 111, including the semiconductor layer SM, the data line DL, the source electrode SE, and the drain electrode DE. The planarization layer 131 planarizes an upper portion of the TFT.

The planarization layer 131 may include an inorganic insulating material such as silicon nitride (SiNx) and/or silicon oxide (SiOx). Alternatively, or additionally the planarization layer 131 may include an organic layer. For example, the planarization layer 131 may have a double-layer structure including a lower inorganic layer and an upper organic layer.

The pixel electrode PE may be disposed on the planarization layer 131. The pixel electrode PE is connected to the drain electrode DE through a contact hole CH of the planarization layer 131. A pixel electrode PE is disposed on a first pixel PX1, and another pixel electrode PE is disposed on a second pixel PX2. Each pixel electrode PE may include a transparent conductive material such as indium tin oxide (ITO) and/or indium zinc oxide (IZO).

The first polarizer 310 may be disposed on the display substrate 110. When a side of the first substrate 111, on which the pixel electrode PE is disposed, is a front surface of the first substrate 111, and an opposite side of the first substrate 111 is a rear surface of the first substrate 111, the first polarizer 310 may be disposed on the rear surface of the first substrate 111.

The first polarizer 310 may include, for example, a linear polarizer. The linear polarizer may include, for example, polyvinyl alcohol (PVA). In addition, the first polarizer 310 may include a compensation film. The compensation film may include, for example, a viewing angle compensation film or a retardation film. The retardation film may include at least one of a quarter-wave plate or a half-wave plate.

The opposing substrate 210 may include the second substrate 211, the color conversion layer 230, the polarizer unit 500, and the common electrode CE.

The second substrate 211 may include transparent glass or plastic.

The color conversion layer 230 may be disposed on the second substrate 211. The color conversion layer 230 may include color conversion portions 231 and 232 and a light blocking portion BM.

The light blocking portion BM is disposed on the second substrate 211, and includes a plurality of openings. The openings of the light blocking portion BM correspond to respective pixel electrodes PE of the first and second pixels PX1 and PX2. The light blocking portion BM blocks light except for at the openings. For example, the light blocking portion BM is disposed on the TFT, the gate line GL, and the data line DL of the first and second pixels PX1 and PX2 to block light from being emitted outwards (e.g., from being emitted to a user of the display device 101).

The color conversion portions 231 and 232 may be disposed at the openings of the light blocking portion BM, overlapping the pixel electrodes PE. An edge of the color conversion portions 231 and 232 may be disposed on the light blocking portion BM.

The light blocking portion BM and the color conversion portions 231 and 232 may be disposed on different layers. In an exemplary embodiment of the present invention, the light blocking portion BM is omitted. Even when the light blocking portion BM is omitted, the color conversion layer 230 may include the color conversion portions 231 and 232 overlapping the pixel electrodes PE.

The color conversion portions 231 and 232 convert a wavelength of a light incident from the backlight unit 410 to emit a light having a different wavelength.

The color conversion portions 231 and 232 may include a phosphor that absorbs light of a first wavelength and emits light of a second wavelength different from the first wavelength. The color conversion portions 231 and 232 may be separated from each other by the light blocking portion BM.

Referring to FIG. 3, the color conversion layer 230 may include a first color conversion portion 231 and a second color conversion portion 232. For example, the first color conversion portion 231 may correspond to a red pixel and the second color conversion portion 232 may correspond to a green pixel. The first color conversion portion 231 may include a red phosphor and the second color conversion portion 232 may include a green phosphor.

In addition, the color conversion layer 230 may include a third color conversion portion. The third color conversion portion may display a color other than red or green.

In addition, the color conversion layer 230 may include a light-transmissive portion. A wavelength of a light passing through the light-transmissive portion does not change. For example, when the backlight unit 140 emits a blue light toward the display substrate 110, the light-transmissive portion may correspond to a blue pixel.

The color conversion layer 230 may include a phosphor. For example, the color conversion portions 231 and 232 may include a resin that may include a phosphor.

The phosphor is a substance that emits fluorescence when exposed to light such as radiant light, or the like. The phosphor emits light having a color that corresponds to the color of the phosphor. In addition, the phosphor emits light in all directions irrespective of a propagation direction of the exposing light.

In addition, the color conversion portions 231 and 232 may further include a reflector. The reflector may include, for example, $TiO_2$. The reflector may have a particle shape, and may be dispersed in a resin that includes the phosphor.

A quantum dot, a quantum rod, or the like may be used as the phosphor.

The quantum dot absorbs light incident thereto and emits light having a different wavelength from a wavelength of the incident light. For example, the quantum dot is a wavelength converting particle that may be used to convert the wavelength of light incident to the quantum dot. A range of wavelengths that a quantum dot may convert varies depending on the size of the quantum dot. For example, by adjusting a diameter of the quantum dot, the quantum dot may emit light of a desired color. The quantum dot has a high extinction coefficient and a high quantum yield, when compared to the extinction coefficient and quantum yield of other fluorescent dyes. Thus, a quantum dot may have a high fluorescence. A quantum dot may absorb light of a first wavelength and emit light of a second wavelength that is longer than the first wavelength.

In an exemplary embodiment of the present invention, the color conversion layer 230 may include quantum dots. For example, the color conversion portions 231 and 232 include quantum dots.

A quantum dot may have a structure including a core nanocrystal and a shell nanocrystal surrounding the core nanocrystal. In addition, the quantum dot may further include an organic ligand bound to the shell nanocrystal and an organic coating layer surrounding the shell nanocrystal.

The shell nanocrystal may have two or more layers. The shell nanocrystal is disposed on a surface of the core nanocrystal.

The quantum dot may include at least one substance of group II compound semiconductors, group III compound semiconductors, group V compound semiconductors, or group VI compound semiconductors. For example, the core nanocrystal, forming the quantum dot, may include: PbSe, InAs, PbS, CdSe, InGaP, CdTe, CdS, ZnSe, ZnTe, ZnS, HgTe, and/or HgS. The shell nanocrystal may include: CuZnS, CdSe, CdTe, CdS, ZnSe, ZnTe, ZnS, HgTe, and/or HgS.

For example, in a case where the core nanocrystal includes CdSe, a blue light may be emitted when a diameter of a quantum dot is in a range of about 1 nm to about 3 nm, a green light may be emitted when the diameter of the quantum dot is in a range of about 3 nm to about 5 nm, and a red light may be emitted when the diameter of the quantum dot is in a range of about 7 nm to about 10 nm.

The quantum dot may be formed by a wet-chemical method. The wet-chemical method may be a method of growing particles by adding a precursor material to an organic solvent.

The polarizer unit 500 may be disposed on the color conversion layer 230. The polarizer unit 500 is disposed more adjacent to the liquid crystal layer LC than the color conversion layer 230. For example, referring to FIG. 3, the polarizer unit 500 is disposed below the color conversion layer 230.

A buffer layer 561 is disposed between the polarizer unit 500 and the color conversion layer 230. The buffer layer 561 is configured to prevent permeation of undesirable elements or substances into the polarizer unit 500 and the color conversion layer 230, and to planarize a surface therebelow.

The buffer layer 561 may include at least one layer selected from various organic layers or inorganic layers. For example, the buffer layer 561 may include one inorganic layer or one organic layer, or may have a structure in which an organic layer and an inorganic layer are stacked on each other. However, the buffer layer 561 may be omitted.

With respect to the second substrate 211, the common electrode CE is disposed on the polarizer unit 500. For example, the common electrode CE may be disposed over an entire surface of the second substrate 211, including the polarizer unit 500. The common electrode CE may include a transparent conductive material such as ITO or IZO.

The common electrode CE and the pixel electrode PE apply an electric field over the liquid crystal layer LC. For example, an electric field is generated between the common electrode CE and the pixel electrode PE, and the liquid crystal layer LC is exposed to the electric field.

Referring to FIG. 3, a first protection layer 550 is disposed between the common electrode CE and the polarizer unit 500, and the common electrode CE and the polarizer unit 500 are connected to each other through a contact hole 551 of the first protection layer 550.

Figure 4:
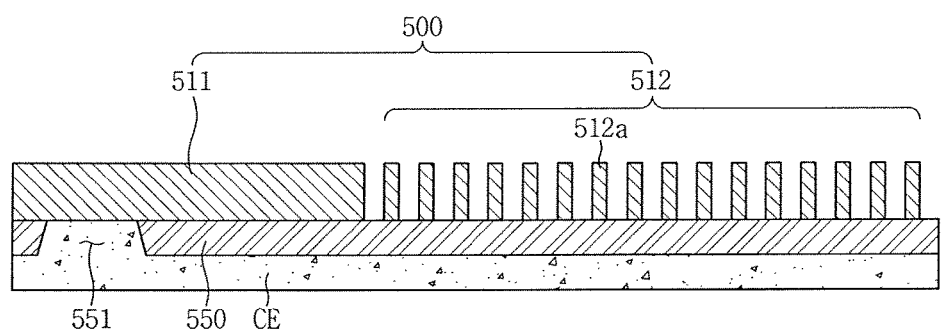
FIG. 4 is a cross-sectional view illustrating a polarizer unit and a common electrode, according to an exemplary embodiment of the present invention.

FIG. 4 is a cross-sectional view illustrating the polarizer unit 500 and the common electrode CE, according to an exemplary embodiment of the present invention.

The polarizer unit 500 may include a blocking portion 511 and a polarizing portion 512.

Referring to FIGS. 3 and 4, the common electrode CE is disposed on the liquid crystal layer LC, the first protection layer 550 is disposed on the common electrode CE, the polarizer unit 500 is disposed on the first protection layer 550, and the color conversion layer 230 is disposed on the polarizer unit 500.

However, exemplary embodiments of the present invention are not limited thereto, and an insulating layer, a protection layer, or the like may be disposed between the common electrode CE, the polarizer unit 500, the first protection layer 550 and the color conversion layer 230.

The polarizer unit 500 may include the polarizing portion 512 for polarizing light and the blocking portion 511 for blocking light. Referring to FIGS. 3 and 4, the blocking portion 511 is connected to the common electrode CE through the contact hole 551 of the first protection layer 550.

The polarizer unit 500 may include a metal, for example, aluminum (Al), gold (Au), silver (Ag), copper (Cu), chromium (Cr), iron (Fe) and/or nickel (Ni).

The blocking portion 511 may include aluminum (Al), gold (Au), silver (Ag), copper (Cu), chromium (Cr), iron (Fe), and/or nickel (Ni). The blocking portion 511 has electrical conductivity.

The blocking portion 511 is electrically connected to the common electrode CE and has a substantially equivalent electric potential as the electric potential of the common electrode CE. For example, common electrode CE may receive a common voltage from the blocking portion 511. The blocking portion 511 may serve as an auxiliary wiring (or wire) for supplying a common voltage to the common electrode CE. The blocking portion 511 may receive the common voltage from a terminal having a substantially equivalent electric potential as the electric potential of the common electrode CE. For example, the blocking portion 511 may be connected to a common electrode wiring for applying the common voltage to the common electrode CE.

In the case of a large-sized display device, a common electrode CE having a large area is used. The common electrode CE may receive a voltage from a wiring at an edge of the first substrate 111. In a case where the common electrode CE has a large area, a voltage drop (IR Drop) may occur at a point of the common electrode CE that is remote from the wiring. According to an exemplary embodiment of the present invention, since the blocking portion 511 supplies the common voltage to the common electrode CE, the voltage drop (IR drop) at the common electrode CE may be reduced. Accordingly, the display quality of the display device 101 may be increased, and the occurrence of ripple may be prevented or reduced.

The polarizing portion 512 may include a plurality of line patterns 512a. Each line pattern 512a may have a straight line shape of a predetermined width that extends in a certain direction. The plurality of line patterns 512a are spaced apart from each other at a predetermined interval.

Each line pattern 512a may include a metal. The polarizing portion 512, including the plurality of metal line patterns 512a, may be referred to as a wire grid polarizer ("WGP"). The polarizing portion 512 may linearly polarize light.

The line pattern 512a may include, for example, aluminum (Al), gold (Au), silver (Ag), copper (Cu), chromium (Cr), iron (Fe), and/or nickel (Ni).

The polarizing portion 512 may be formed by methods such as an imprint method using a mold, a photolithography method, or the like. However, exemplary embodiments of the present invention are not limited thereto.

According to an exemplary embodiment of the present invention, a transmission axis of the polarizer portion 512 and a transmission axis of the first polarizer 310 are orthogonal to each other, and the transmission axis of one of the polarizing portion 512 and the first polarizer 310 may be arranged to be parallel to the gate line GL.

Figure 5:
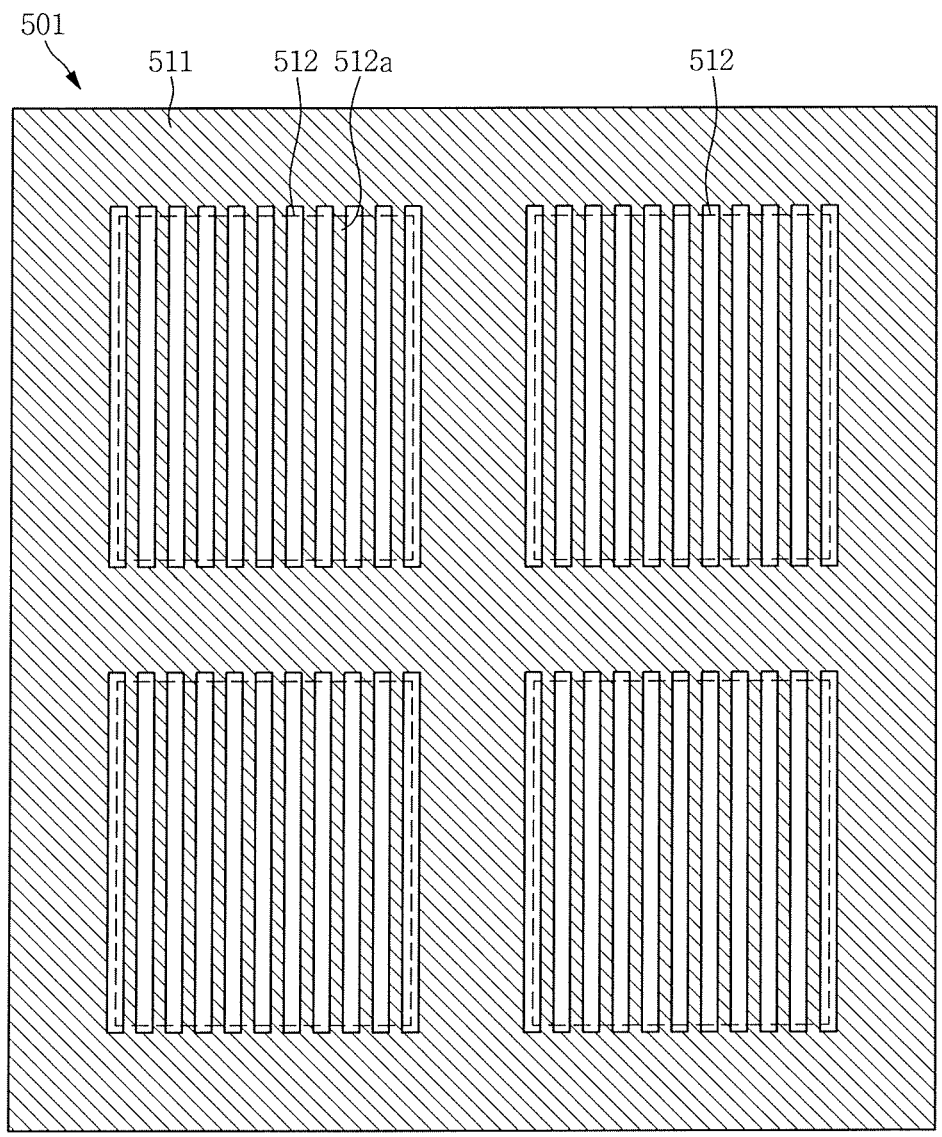
FIG. 5 is a plan view illustrating a polarizer unit according to an exemplary embodiment of the present invention.

FIG. 5 is a plan view illustrating a polarizer unit 501 according to an exemplary embodiment of the present invention.

Referring to FIG. 5, the polarizer unit 501 may include a blocking portion 511 and a polarizing portion 512. The blocking portion 511 may have a lattice shape. The polarizing portion 512 may be disposed at certain locations of the polarizer unit 501. For example, the polarizing portion 512 may be surrounded by the blocking portion 511.

The blocking portion 511 of FIG. 5 may overlap, for example, a data line DL and a gate line GL. Further, the blocking portion 511 may overlap a light blocking portion BM. On a plan view, the blocking portion 511 may overlap the light blocking portion BM and might not protrude outside of the footprint of the light blocking portion BM. For example, the blocking portion 511 may be fully overlapped by the light blocking portion BM.

Referring to FIG. 5, the blocking portion 511 is connected to the polarizing portion 512. For example, a plurality of line patterns 512a, included in the polarizing portion 512, are connected to the blocking portion 511.

Figure 6:
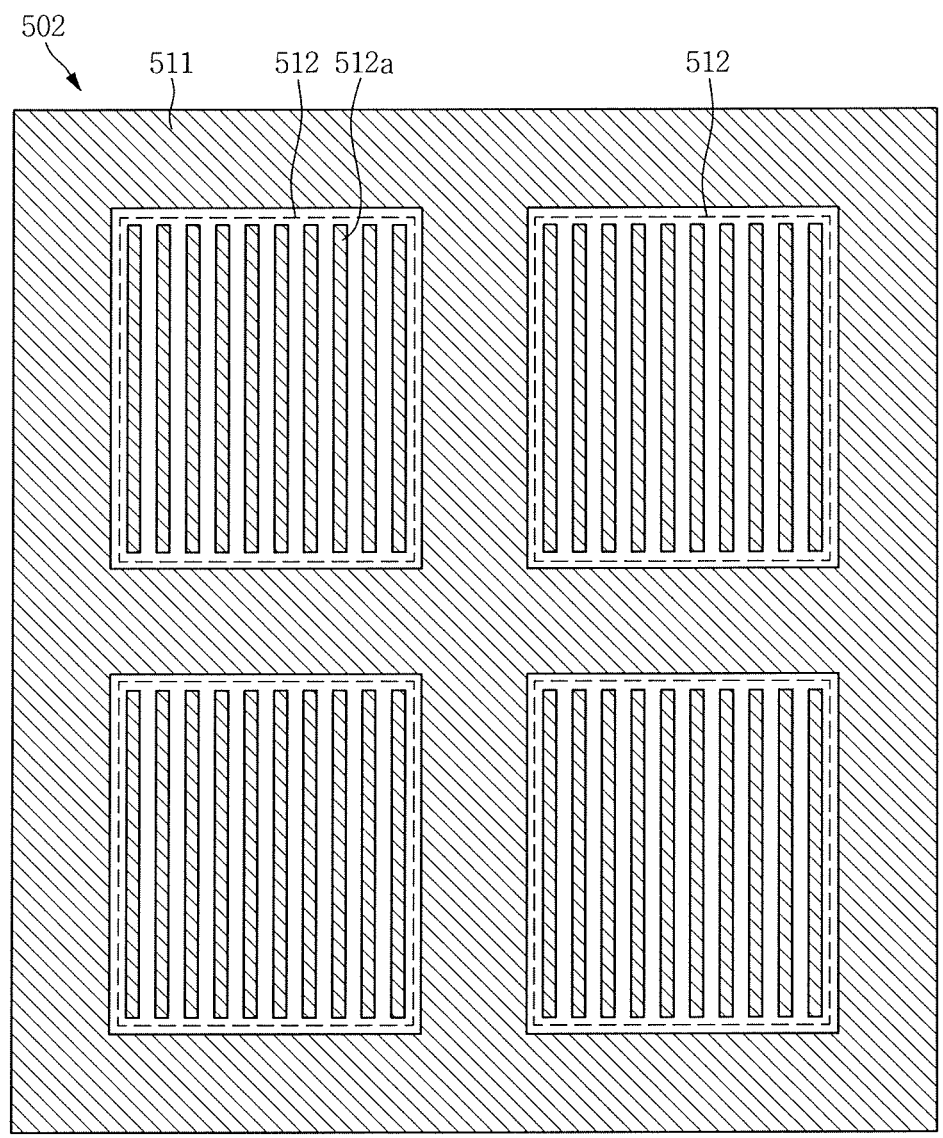
FIG. 6 is a plan view illustrating a polarizer unit according to an exemplary embodiment of the present invention.

FIG. 6 is a plan view illustrating a polarizer unit 502 according to an exemplary embodiment of the present invention. Referring to FIG. 6, the polarizer unit 502 may include a polarizing portion 512 and a blocking portion 511 surrounding the polarizing portion 512. The blocking portion 511 may have a lattice shape.

Referring to FIG. 6, the blocking portion 511 is spaced apart from the polarizing portion 512. For example, a plurality of line patterns 512a, included in the polarizing portion 512, are not connected to the blocking portion 511.

Figure 7:
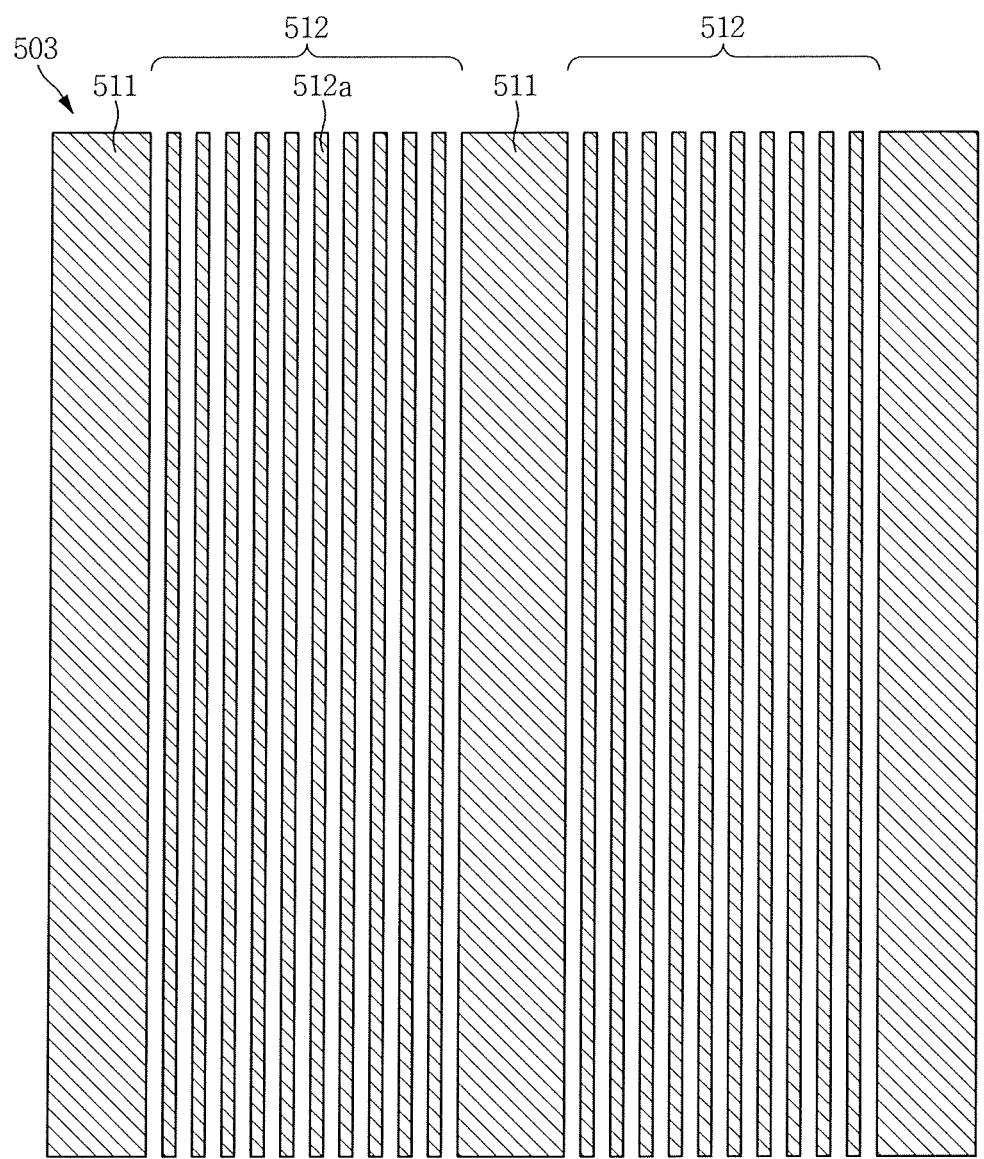
FIG. 7 is a plan view illustrating a polarizer unit according to an exemplary embodiment of the present invention.

FIG. 7 is a plan view illustrating a polarizer unit according to an exemplary embodiment of the present invention. Referring to FIG. 7, the blocking portion 511 has a line shape. In FIG. 7, each of the blocking portions 511 and the polarizing portion 512 has a line shape. In addition, the blocking portions 511 may be parallel to each other and to the polarizing portions 512. In addition, the polarizing portions 512 may be parallel to each other. The blocking portions 511 of FIG. 7 may overlap, for example, the data lines DL.

Figure 8:
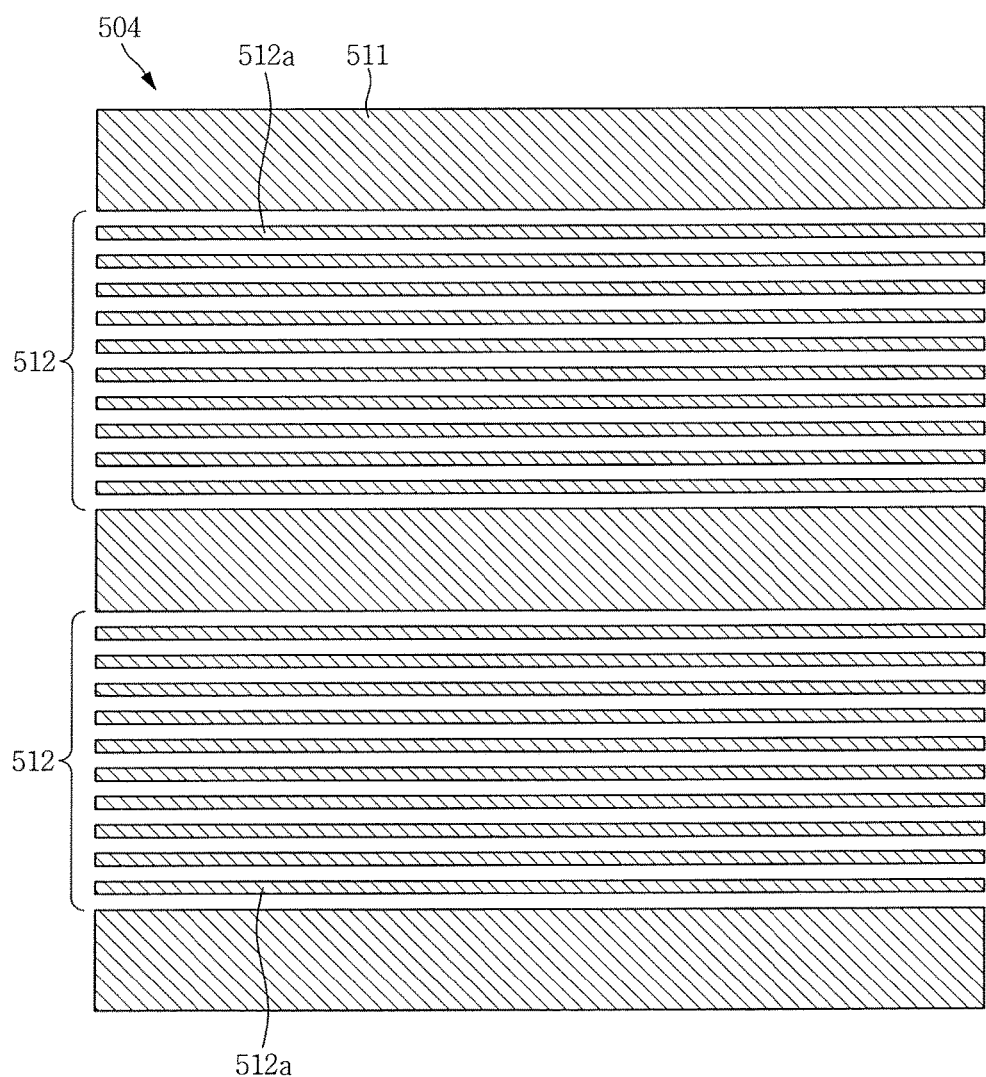
FIG. 8 is a plan view illustrating a polarizer unit according to an exemplary embodiment of the present invention.

FIG. 8 is a plan view illustrating a polarizer unit according to an exemplary embodiment of the present invention. Referring to FIG. 8, each of the blocking portions 511 and the polarizing portion 512 has a line shape. In addition, the blocking portions 511 may be parallel to each other and to the polarizing portions 512. In addition, the polarizing portions 512 may be parallel to each other. The blocking portions 511 of FIG. 8 may overlap, for example, the gate lines GL.

Figure 9:
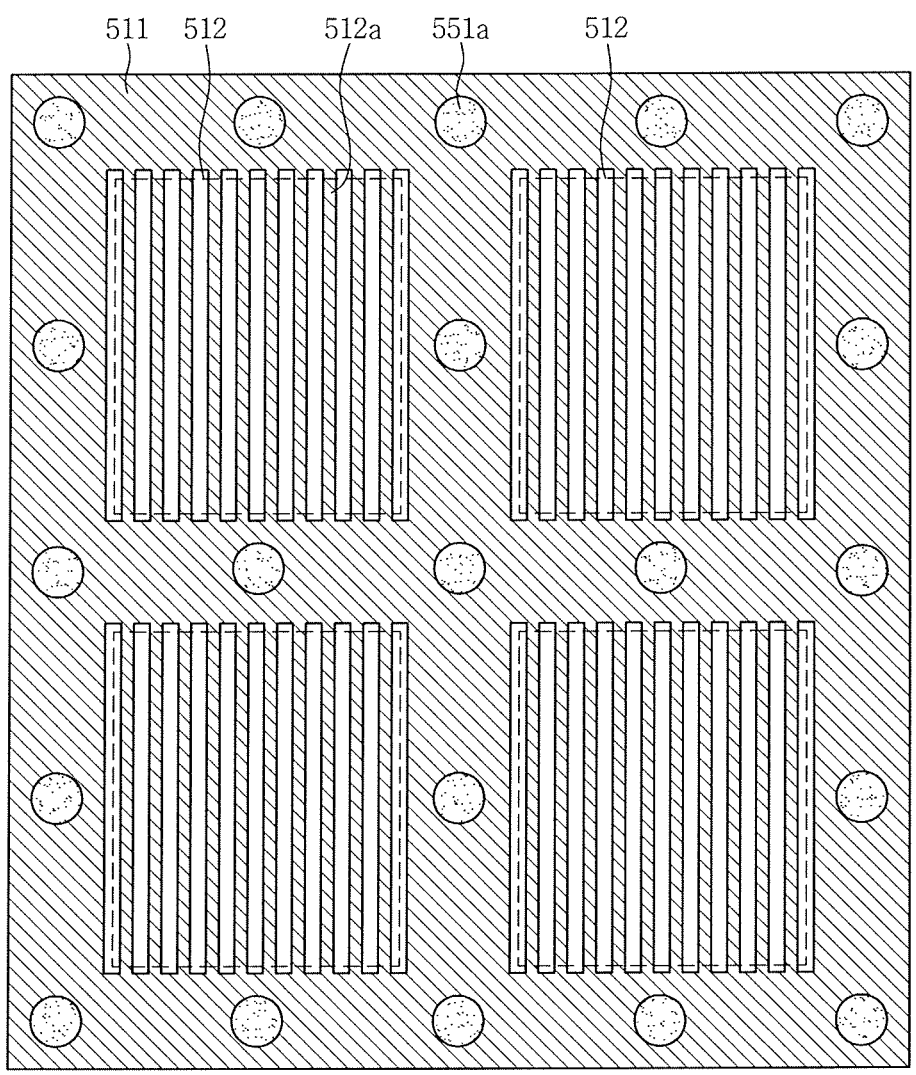
FIG. 9 is a plan view illustrating disposition of a polarizer unit and a contact hole according to an exemplary embodiment of the present invention.

FIG. 9 is a plan view illustrating disposition of a polarizer unit 500 and a contact hole 551a according to an exemplary embodiment of the present invention.

Referring to FIGS. 3, 4 and 9, contact holes 551 and 551a are formed in the first protection layer 550. The blocking portion 511 and the common electrode CE are connected to each other through the contact holes 551 and 551a. The contact holes 551 and 551a overlap the blocking portion 511 to electrically connect the blocking portion 511 and the common electrode CE.

Referring to FIG. 9, the contact hole 551a may have a circular planar shape. However, the shape of the contact hole 551a is not limited to that illustrated in FIG. 9. The contact hole 551a may have an elliptical, semicircular, or polygonal planar shape.

The blocking portion 511 may include a plurality of contact holes 551a. For example, the blocking portion 511 may include a number of contact holes 551a needed to electrically connect the blocking portion 511 with the common electrode CE.

Figure 10:
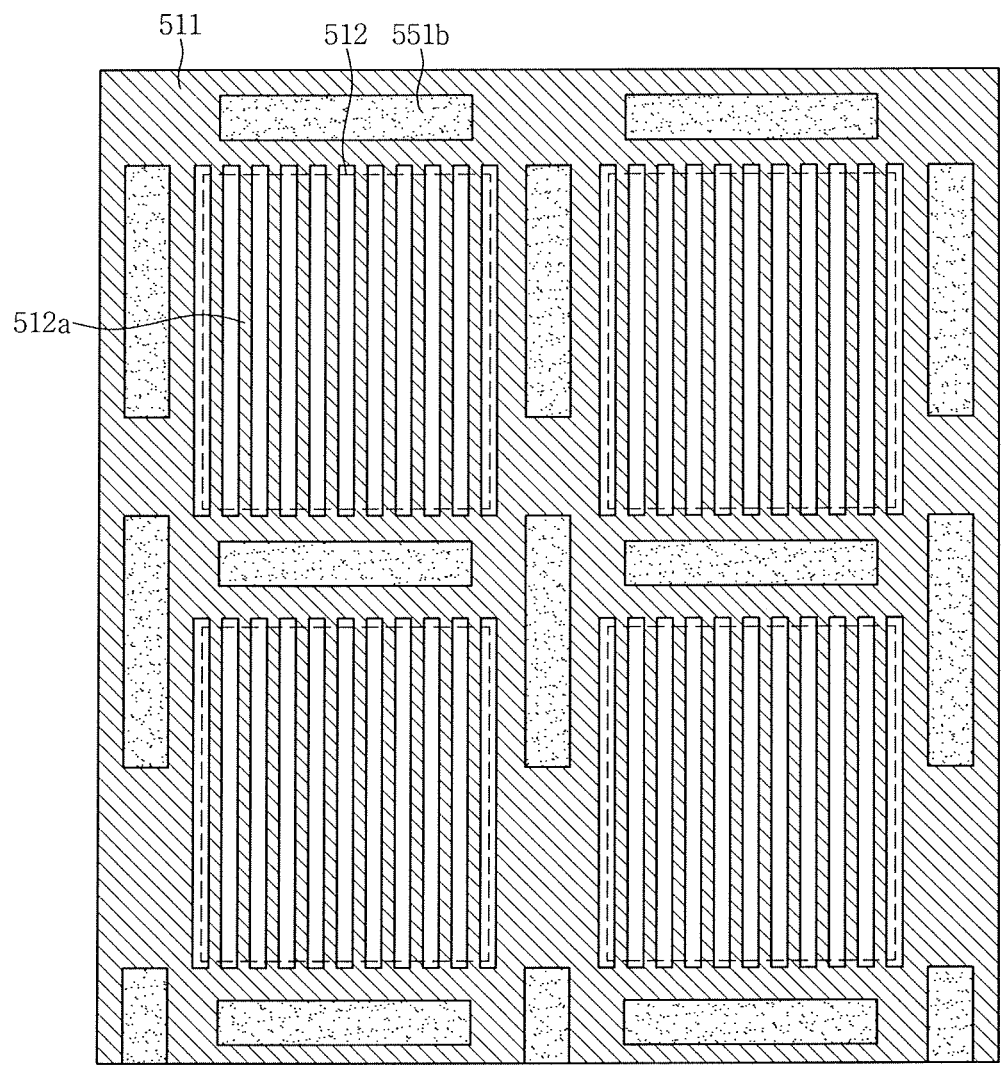
FIG. 10 is a plan view illustrating disposition of a polarizer unit and a contact hole according to an alternative exemplary embodiment of the present invention.

FIG. 10 is a plan view illustrating disposition of a polarizer unit 500 and a contact hole 551b according to an exemplary embodiment of the present invention. Referring to FIG. 10, the contact hole 551b has a quadrangular planar surface shape.

Figure 11:
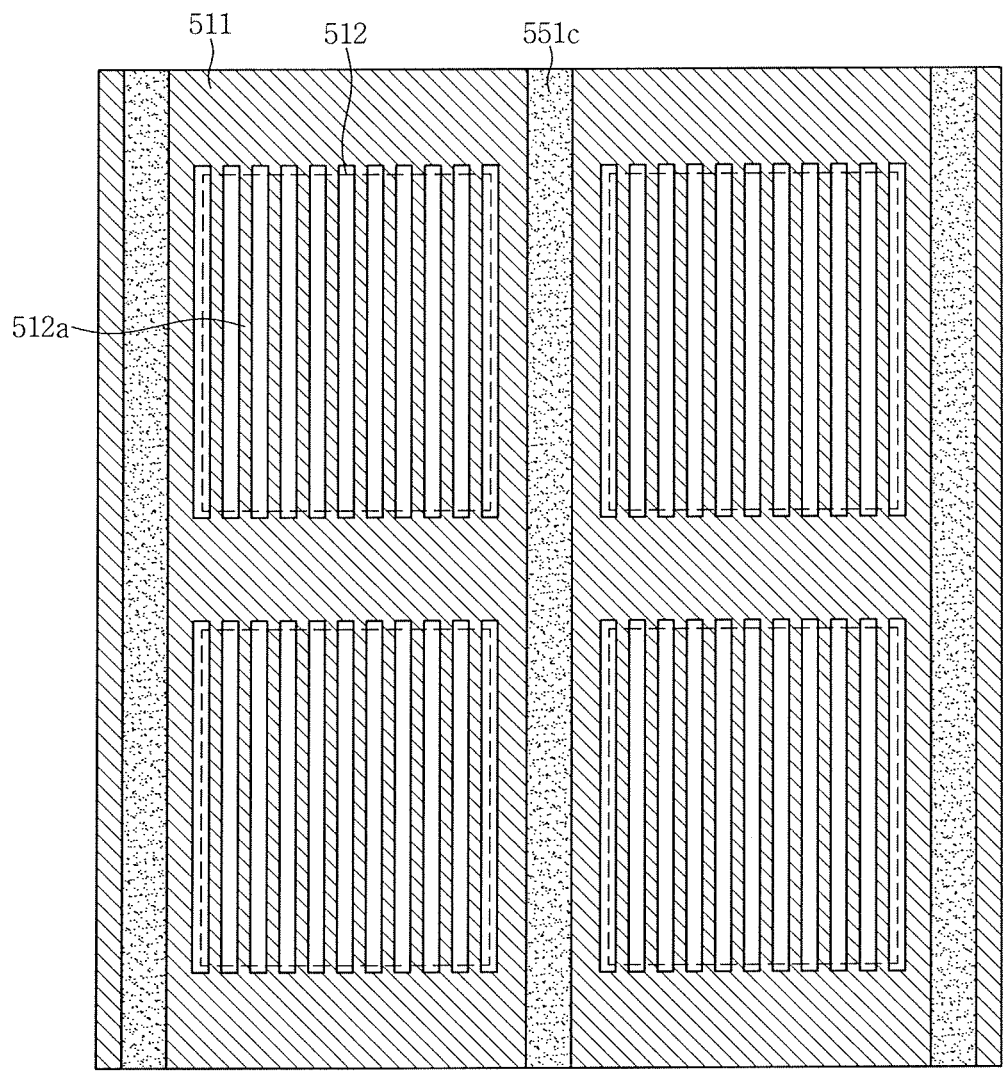
FIG. 11 is a plan view illustrating disposition of a polarizer unit and a contact hole according to an exemplary embodiment of the present invention.

FIG. 11 is a plan view illustrating disposition of a polarizer unit 500 and a contact hole 551c according to an exemplary embodiment of the present invention. Referring to FIG. 11, the contact hole 551c has a line shape.

Figure 12:
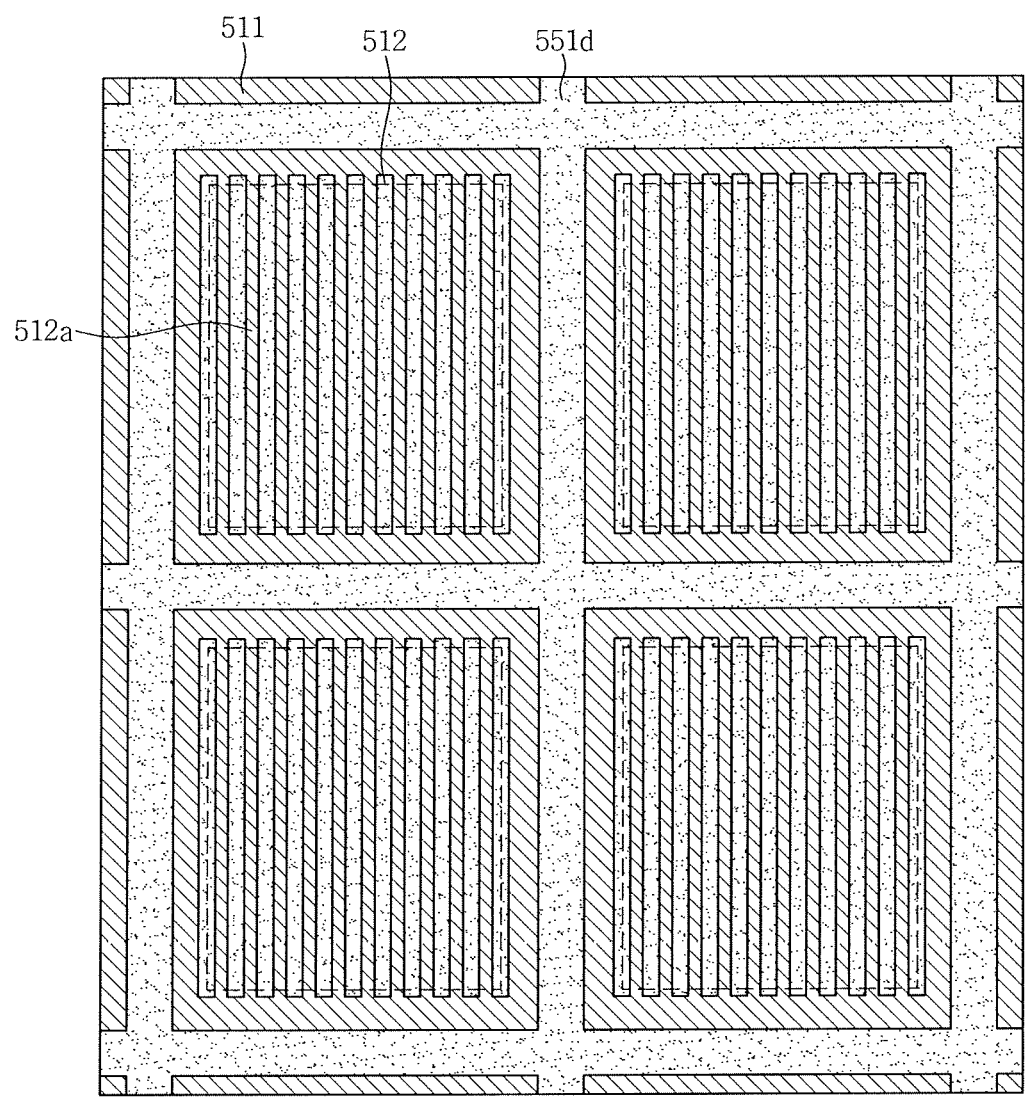
FIG. 12 is a plan view illustrating disposition of a polarizer unit and a contact hole according to an exemplary embodiment of the present invention.

FIG. 12 is a plan view illustrating disposition of a polarizer unit 500 and a contact hole 551d according to an exemplary embodiment of the present invention. Referring to FIG. 12, the contact hole 551d has a lattice planar surface shape.

Figure 13:
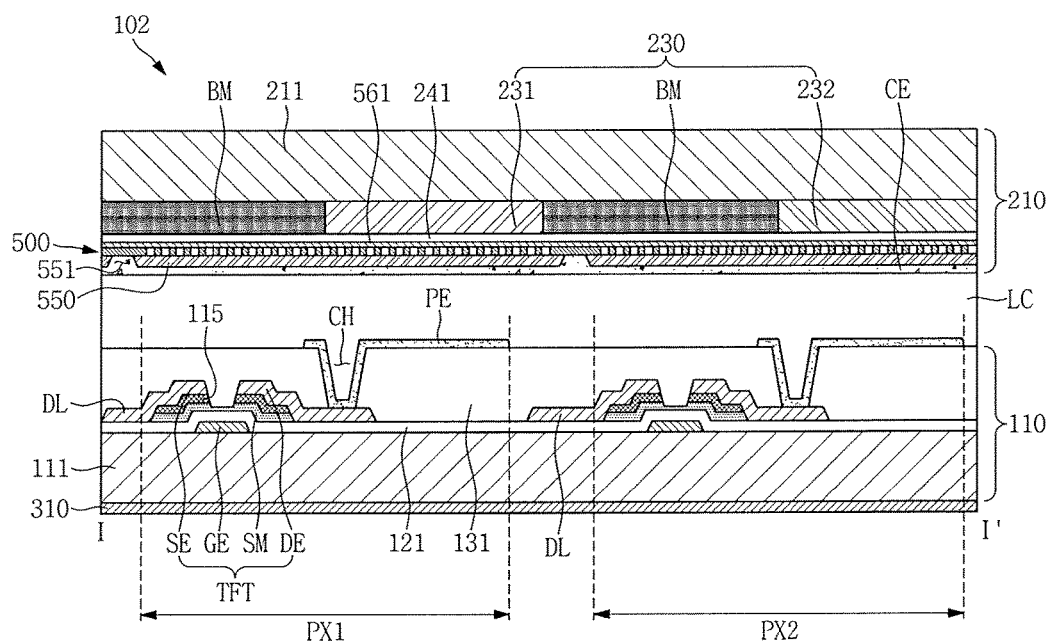
FIG. 13 is a cross-sectional view illustrating a display device according to an exemplary embodiment of the present invention.

FIG. 13 is a cross-sectional view illustrating a display device 102 according to an exemplary embodiment of the present invention.

The display device 102 may include a substantially same structure as the structure of the display device 101 illustrated in FIG. 3, except that the display device 102 may include a dichroic reflection layer 241 between the polarizer unit 500 and the color conversion layer 230.

The dichroic reflection layer 241 may include a dichroic filter. The dichroic filter is a filter that transmits light having a predetermined wavelength, from incident light, and reflects light having wavelengths other than the predetermined wavelength.

When light incident from a backlight unit 410 is a blue light, the dichroic reflection layer 241 may be configured to transmit the blue light and to reflect light of all other colors. In an exemplary embodiment of the present invention, the light incident from the backlight unit 410 passes through the dichroic reflection layer 241. Red light and green light, converted by the color conversion layer 230, is reflected at the dichroic reflection layer 241. Accordingly, the dichroic reflection layer 241 may be referred to as a yellowish reflection filter (YRF).

Since the red light and the green light is reflected at the dichroic reflective layer 241, the red and green lights, generated by the color conversion layer 230, might not be reflected back toward the liquid crystal layer LC, but may be instead reflected by the dichroic reflection layer 241 toward the second substrate 211 to be emitted outwards (e.g., toward the user). Accordingly, the light efficiency of the display device 102 may be increased.

The dichroic reflection layer 241 may include a plurality of high refractive index layers and a plurality of low refractive index layers that are alternately stacked. The dichroic reflection layer 241 may serve a selective light transmitting function based on its multilayer interference phenomenon due to the plurality of high refractive index layers and the plurality of low refractive index layers. Each low refractive index layer may include $MgF_2$ and/or $SiO_2$, and each high refractive index layer may include Ag, $TiO_2$, $Ti_2O_3$, and/or $Ta_2O_3$, but exemplary embodiments of the present invention are not limited thereto. A thickness of a low refractive index layer and a thickness of a high refractive index layer may be in a range of about ⅛ to about ½ of a wavelength of the transmitted light.

The wavelengths of the transmitted light and the reflected light may be adjusted based on the configuration of each layer (e.g., high and/or low refractive index layer) included in the dichroic reflection layer 241.

Figure 14:
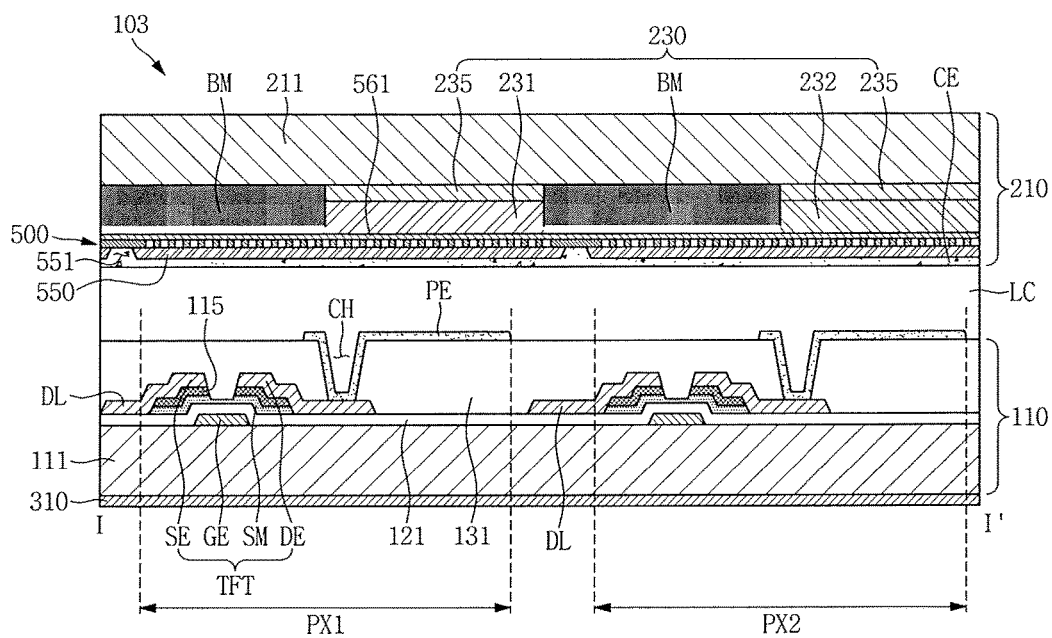
FIG. 14 is a cross-sectional view illustrating a display device according to an exemplary embodiment of the present invention.

FIG. 14 is a cross-sectional view illustrating a display device 103 according to an exemplary embodiment of the present invention.

Referring to FIG. 14, the color conversion layer 230 may include a first color conversion portion 231, which is a red color conversion portion, and a second color conversion portion 232, which is a green color conversion portion. In addition, the color conversion layer 230 may include a yellow color filter 235 on the first color conversion portion 231 and on the second color conversion portion 232. The yellow color filter 235 absorbs blue light and transmits red light and green light.

According to an exemplary embodiment of the present invention, blue light emitted from the backlight unit 410 is incident on the color conversion layer 230. Among the blue light incident on the first color conversion portion 231, light converted into red light is transmitted through the yellow color filter 235 and blue light not converted to the red light is absorbed by the yellow color filter 235. In addition, among blue light incident to the second color conversion portion 232, light converted into green light is transmitted through the yellow color filter 235 and blue light not converted to the green light is absorbed by the yellow color filter 235. Accordingly, distinctive red and green colors are realized in red and green pixels, respectively, and the display quality of the display device may be increased.

Figure 15:
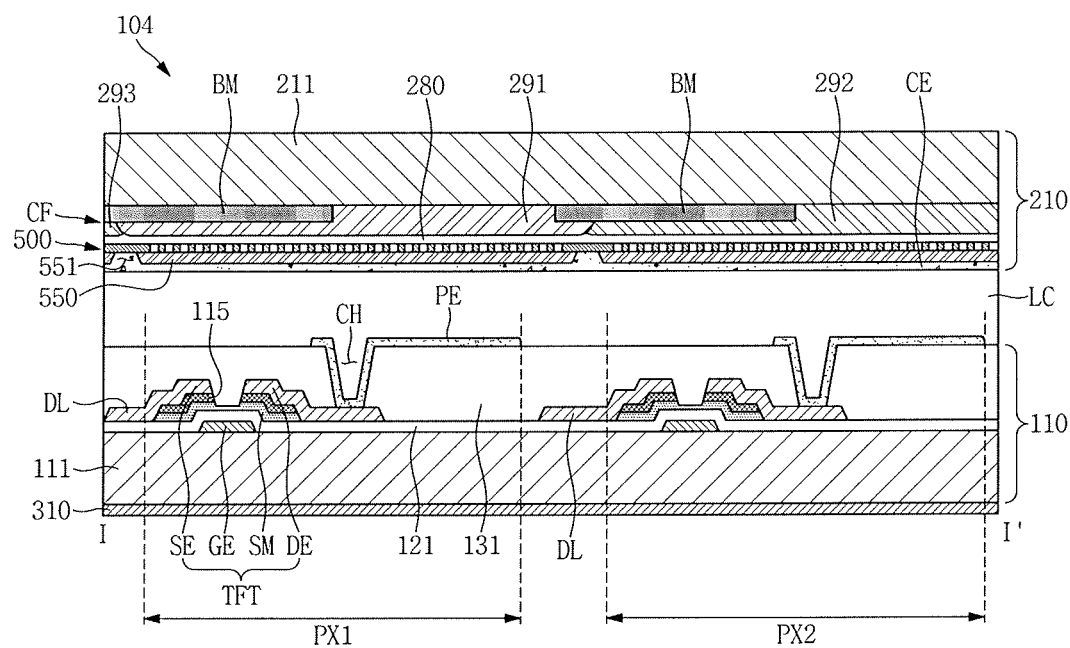
FIG. 15 is a cross-sectional view illustrating a display device according to an exemplary embodiment of the present invention.

FIG. 15 is a cross-sectional view illustrating a display device 104 according to an exemplary embodiment of the present invention.

The display device 104 of FIG. 15 may include a display substrate 110, a liquid crystal layer LC on the display substrate 110, a common electrode CE on the liquid crystal layer LC, a first protection layer 550 on the common electrode CE, a polarizer unit 500 on the first protection layer 550, and a color filter layer CF on the polarizer unit 500.

The color filter layer CF may include a first color filter 291, a second color filter 292, and a third color filter 293. Each of the first color filter 291, the second color filter 292, and the third color filter 293 may be any one of a red color filter, a green color filter, and a blue color filter. One of the first color filter 291, the second color filter 292 and the third color filter 293 may be a white color filter or may have a color other than red, green, or blue.

With respect to the second substrate 211, a buffer layer 280 is disposed on the color filter layer CF, and the polarizer unit 500 is disposed on the buffer layer 280.

Any one of the polarizer units 501, 502, 503, and 504 disclosed in FIGS. 5, 6, 7, and 8 may be used as the polarizer unit 500 in FIG. 15. The polarizer unit 500 may include a polarizing portion 512 for polarizing light and a blocking portion 511 for blocking light. The blocking portion 511 is connected to the common electrode CE through a contact hole 551 of the first protection layer 550.

The polarizer unit 500 may include a metal and the polarizer unit 500 may have electrical conductivity. The blocking portion 511 has a substantially equivalent electric potential as the electric potential of the common electrode CE. The blocking portion 511 may serve to supply a common voltage to the common electrode CE.

The polarizer 512 may be a WGP.

As set forth above, according to one or more exemplary embodiments of the present invention, the polarizer unit may serve as an auxiliary wiring for supplying power to the common electrode. Accordingly, a voltage drop may be reduced at the common electrode, and the display device may have excellent display quality.

While the present invention has been illustrated and described with reference to the exemplary embodiments thereof, it will be apparent to those of ordinary skill in the art that various changes in form and detail may be made thereto without departing from the spirit and scope of the present invention.

What is claimed is:

1. A display device comprising:
a display substrate;
a liquid crystal layer disposed on the display substrate;
a common electrode disposed on the liquid crystal layer;
a first protection layer disposed on the common electrode;
a polarizer unit disposed on the first protection layer; and
a color conversion layer disposed on the polarizer unit,
wherein the polarizer unit comprises:
  a polarizing portion that polarizes light; and
  a blocking portion that blocks transmittance of light,
wherein the blocking portion is connected to the common electrode through a contact hole, wherein the contact hole is an opening in the first protection layer.

2. The display device of claim 1, wherein the polarizing portion is a wire grid polarizer (WGP).

3. The display device of claim 1, wherein the polarizer unit comprises a metal.

4. The display device of claim 1, wherein the blocking portion has an electric potential that is substantially equal to an electric potential of the common electrode.

5. The display device of claim 1, wherein the blocking portion is connected to the polarizing portion.

6. The display device of claim 1, wherein the blocking portion is spaced apart from the polarizing portion.

7. The display device of claim 1, wherein the blocking portion has a lattice shape.

8. The display device of claim 1, wherein the blocking portion has a line shape.

9. The display device of claim 1, wherein the color conversion layer comprises quantum dots.

10. The display device of claim 1, wherein the color conversion layer comprises:
a red color conversion portion comprising a red phosphor; and
a green color conversion portion comprising a green phosphor.

11. The display device of claim 10, wherein the color conversion layer further comprises a light-transmissive portion.

12. A display device comprising:
a display substrate;
a liquid crystal layer disposed on the display substrate;
a common electrode disposed on the liquid crystal layer;
a first protection layer disposed on the common electrode;
a polarizer unit disposed on the first protection layer; and
a color filter layer disposed on the polarizer unit,
wherein the polarizer unit comprises:
  a polarizing portion polarizing light; and
  a blocking portion blocking light, wherein
the blocking portion is connected to the common electrode through a contact hole of the first protection layer.

13. The display device of claim 12, wherein the polarizing portion is a wire grid polarizer (WGP).

14. The display device of claim 12, wherein the polarizer unit comprises a metal.

15. The display device of claim 12, wherein the blocking portion has an electric potential that is substantially equal to an electric potential of the common electrode.

16. A display device comprising:
a first substrate;
a second substrate;
a liquid crystal layer disposed between the first and second substrates;
a backlight unit disposed on a first surface of the first substrate;
a thin film transistor disposed on a second surface of the first substrate, opposite to the first surface of the first substrate, wherein the thin film transistor is connected to a pixel electrode;
a common electrode disposed on the second substrate;
a protection layer disposed on the second substrate; and
a polarizing layer disposed on the second substrate,
wherein the protection layer is disposed between the common electrode and the polarizing layer,
wherein the thin film transistor includes a source electrode, and wherein the source electrode is an extension of, or connected to a data line,
wherein the polarizing layer includes a blocking portion, overlapping the data line, and a light-polarizing portion, overlapping the pixel electrode,
wherein the protection layer includes at least one hole, and wherein the common electrode and the blocking portion are electrically connected to each other through the at least one hole.

17. The display device of claim 16, further comprising a color conversion layer disposed on the second substrate,
wherein the color conversion layer includes a first portion and a second portion,
wherein, when the backlight unit provides light of a first wavelength to the color conversion layer, the light of the first wavelength passes through the first portion to be converted into light of a second wavelength, and the light of the first wavelength passes through the second portion to become light of a third wavelength, wherein each of the second and third wavelengths is longer than the first wavelength.

18. The display device of claim 17, wherein the second and third wavelengths are different from each other.

19. The display device of claim 17, further comprising a dichroic reflection layer disposed between the color conversion layer and the polarizing layer, wherein the dichroic reflection layer reflects the light of the second wavelength and the light of the third wavelength when the light of the second wavelength and the light of the third wavelength is directed onto the dichroic reflection layer.

20. The display device of claim 16, wherein the polarizing layer comprises a metal.

* * * * *